UNITED STATES PATENT OFFICE.

JÜRGEN CALLSEN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

MONOCINNAMIC ESTER OF GLYCERIN.

999,955.

Specification of Letters Patent. Patented Aug. 8, 1911.

No Drawing. Application filed May 2, 1911. Serial No. 624,590.

*To all whom it may concern:*

Be it known that I, JÜRGEN CALLSEN, doctor of philosophy, chemist, citizen of the German Empire, residing at Elberfeld, Germany, have invented new and useful Improvements in Monocinnamic Ester of Glycerin, of which the following is a specification.

I have found that the new mono-cinnamic ester of glycerin can be obtained by esterification of cinnamic acid with glycerin. The new ester has proved to be an excellent remedy against scabies. It possesses the advantage over Peru balsam hitherto used for this purpose that it is odorless, non-irritant and easily soluble.

In order to illustrate the new process more fully the following example is given, the parts being by weight:—148 parts of cinnamic acid are heated with 400 parts of glycerin and 20 parts of concentrated sulfuric acid (60° Bé.) in an oil bath during 60 hours to 140° C. The melt is then extracted with ether and the ethereal solution is shaken with soda solution until it shows a slightly alkaline reaction. The ethereal solution is then dried, the ether is removed and the residue distilled *in vacuo*. The ester thus obtained is a yellowish oil soluble in alcohol, ether and chloroform.

I claim:—

The herein described glycerin cinnamic ester of the formula

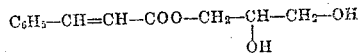

which is a yellowish oil soluble in alcohol, ether and chloroform; and being a valuable remedy against scabies, substantially as described.

In testimony whereof I have hereunto set my hand in the presence of two subscribing witnesses.

JÜRGEN CALLSEN. [L. S.]

Witnesses:
CHAS. J. WRIGHT,
ALFRED HENKEL.